3,424,682
MATERIALS-WORKING COMPOSITION CONTAINING A HIGH MOLECULAR WEIGHT POLYMER
Albert M. Sacerdote, 209 Bullard St.,
Walpole, Mass. 02081
No Drawing. Filed Aug. 8, 1966, Ser. No. 570,689
U.S. Cl. 252—42.1                                    3 Claims
Int. Cl. C10m 7/10

ABSTRACT OF THE DISCLOSURE

A materials-working composition comprising alkali treated karaya gum and a corrosion inhibitor.

---

This invention relates to the reduction of friction.

When water or another mobile liquid is used as a lubricant, it tends to be squeezed out from the areas where two parts contact each other. Unfortunately, this is where the lubricant is most needed. It is sometimes possible to use pressure to force lubricant between two relatively moving parts which bear on each other, as in water-lubricated bearings, but this is often impossible or inconvenient.

It might be possible to thicken the lubricant, for example, water might be thickened with gelatin, but this would make it difficult for the lubricant to flow into the regions where the relatively moving parts most closely approach each other.

It is, therefore, an object of this invention to modify the properties of fluid mixtures so that they flow easily into high shear areas, yet are not easily squeezed out of them. Another object is to provide means for reducing friction in fluid flow systems. A further object of this invention is to provide a lubricant with an unusually high cooling ability. Another object is to provide a product which improves materials working operations.

These and other objects are attained by adding to fluid mixtures between about $1/10$ part per million and about 25% of an alkali treated karaya gum. This is a polysaccharide having a very high molecular weight, and having a long, relatively flexible main chain of atoms. The water solution or sol of karaya gum which has been adequately treated with alkali is easily identified because it is stringy, especially sols or solutions containing $1/10\%$ to 50% of the gum.

By "stringy" I mean that, if a glass rod is dipped into the liquid, and then withdrawn, a string or leg of sol will extend from the rod to the liquid surface. The sol slowly flows back into the body of the solution so that, eventually, the string breaks. If the rod is laterally displaced, the string will hang down from the rod in a catenary; the end of the catenary will move along the liquid surface to, again, form a vertical string, unless the string first breaks.

Another means for identifying the compounds is to fill a circular beaker with a $1/10\%$ to 50% solution or sol of the compound the exact amount depending on the compound and on the fluid. A stirring rod can be pushed through the quiescent liquid and "banged" against the inside wall of the beaker. If the liquid is swirling, it becomes noticeably more difficult to push a stirring rod from the vortex, through the swirling liquid, and "bang" it against the side of the beaker.

The term "solution," as used herein, means a true solution or a colloidal solution, or a dispersion of a suitable compound in a suitable fluid, such as water.

The term "sol," as used herein, means a true solution or a colloidal solution, or a dispersion of a suitable compound in a suitable micromolecular fluid, such as water.

I believe, without being bound to this theory, that solutions or dispersions of the above-described materials are particularly effective lubricants and coolants because the viscosities of their dilute solutions are low, yet the very long, fairly flexible molecules impede flow under suddenly-applied shear. Thus, the solutions or suspensions can easily flow into narrow voids, but they cannot be forced out of them by the application of a sudden shear stress. Probably, the long molecules impart viscoelastic properties to the solution. The energy imparted by sudden shear elastically deforms the molecules from their usual random-coiled state. Thus, the energy is absorbed in a way which does not impart a general fluid flow out of the high shear area.

Another feature of this invention is the mixture of the alkali treated karaya gum with corrosion inhibitors such as amine nitrites. This produces a general-purpose additament for use in cutting oils or lubricants.

Of course, various other useful materials may be added without departing from the scope of this invention. For example, a lubricant for bearings might be improved by the addition of emulsifiers which help wash away any greases in the bearing. A tracer, perhaps radioactive, might be added to the sol if the sol were being used to reduce the friction of fluid flow in a conduit. Diatomaceous earth might be added to the sol if the sol were being used to improve the filtration or settling characteristics of solids suspended in a fluid.

Some examples of the practice of this invention are given below. The examples are presented to aid an understanding of the invention, not to limit the scope of the invention.

EXAMPLE I 20 grams of finely powdered karaya gum were mixed with 400 milliliters (ml.) of water, 100 ml. of white vinegar, and 0.1 gram of microbiocide. The mixture was allowed to stand at room temperature for one day. It was then mixed with 170 ml. of 14% aqueous ammonium hydroxide and 70 ml. of water. After 48 hours at room temperature, the solution was stringy. White vinegar and aqueous sodium bicarbonate solution were added alternately to the mixture to prepare a mildly alkaline, 1% sol of treated karaya in a well-buffered aqueous medium.

This product was used instead of a cutting fluid when parting off a piece of type 304 stainless steel rod on a lathe. Immediately thereafter, the same experienced machinist performed the same operation, on a new section of the rod, using the cutting fluid which he normally uses for this type of work. The karaya sol was as good a cutting fluid as the material normally used for this type of work. Moreover, the amount of smoke produced during parting-off was much reduced when the karaya sol was used.

EXAMPLE II

The procedure of Example I was repeated, substituting K Monel for the stainless steel. K Monel is well known as a difficult-to-machine metal. The machinist noted the same advantages as with stainless steel. Moreover, when the karaya sol was used, the finish on the workpiece was far smoother, the workpiece was not discolored, and the workpiece remained lukewarm to the touch. When the cutting fluid normally used for this work was tried, the workpiece was badly discolored; right after the cutting was completed, the workpiece was much too hot to touch.

EXAMPLE III

The 1% sol of Example I was used as a metalworking fluid in the milling of stainless steel. It was found too viscous to enter the area where the cutter meets the workpiece. On dilution with water, the karaya sol was found to be as good a cutting fluid as that normally used.

It will be understood that the invention is useful in a wide variety of materials-working operations, over a wide range of materials. The materials-working operations include cutting, broaching, tapping, threading, generation of gear teeth, drilling, boring, screw machining, milling, planing, shaping, grinding, turning, sawing, rolling, finning, drawing, swaging and coining.

The fluids may be applied as liquid streams, or as mists or with gases. Although water as a base liquid is best for many operations, other fluids may be found advantageous in special applications. Occasions may be found when the karaya gum is in such a finely divided state as to be equivalent to a fluid can be employed without combination with other ingredients.

For use as lubricants the karaya gum may be mixed with corrosion resistant substances, and, either at the point of manufacture or the point of use, with a base liquid such as water.

Another feature of the invention is the use of karaya gum to improve the flow of fluids in conduits. It has been found that, with water and other fluids, an amount of the polymer sufficient to have a marked effect in reducing fluid friction or increasing rate of flow, will not produce an increase in viscosity of as much as 100 centipoises.

What is claimed is:
1. A lubricating composition comprising a major amount of water, alkali treated karaya gum in the amount of 0.1 part per million to about 25% by weight of the water, and at least one corrosion inhibitor.
2. The composition of claim 1 including 0.1 part per million to about 1% by weight of water of said alkali treated karaya gum.
3. A cutting fluid consisting essentially of water, alkali treated karaya gum in the amount of about 0.1 part per million to 1% by weight of water, and a corrosion inhibitor.

References Cited

UNITED STATES PATENTS

| | | | |
|---|---|---|---|
| 2,439,460 | 4/1948 | Engler | 106—208 |
| 2,660,561 | 11/1953 | Watkins | 252—8.5 |
| 2,816,071 | 12/1957 | Watkins | 252—8.5 |
| 2,956,951 | 10/1960 | Furey | 252—49.3 XR |
| 3,071,545 | 1/1963 | Davis | 252—49.3 XR |
| 3,089,848 | 5/1963 | Morway | 252—18 |
| 3,152,990 | 10/1964 | Coppock et al. | 252—49.3 XR |
| 3,227,652 | 1/1966 | Ackerman | 252—49.3 XR |
| 3,313,728 | 4/1967 | Glasson et al. | 252—49.3 XR |

OTHER REFERENCES

Whistler: "Industrial Gums," Academic Press, New York (1959), pages 348 and 359.

DANIEL E. WYMAN, *Primary Examiner.*

W. H. CANNON, *Assistant Examiner.*

U.S. Cl. X.R.

252—42.7, 49.3